United States Patent [19]

Cavalli

[11] Patent Number: 4,538,427
[45] Date of Patent: Sep. 3, 1985

[54] APPARATUS FOR MAKING ICE CREAM AND SIMILAR COLD PRODUCTS AND HAVING A REMOVABLE FREEZER VESSEL

[76] Inventor: Alfredo Cavalli, 9, Via Galileo Galilei, Pessano Con Bornago (Milan), Italy

[21] Appl. No.: 574,593

[22] Filed: Jan. 27, 1984

[30] Foreign Application Priority Data

Feb. 4, 1983 [IT] Italy .................. 19436 A/83

[51] Int. Cl.³ .................................................. A23G 9/00
[52] U.S. Cl. .................................. 62/342; 165/42
[58] Field of Search .............. 62/342, 343, 293; 165/46

[56] References Cited

U.S. PATENT DOCUMENTS

| | | | |
|---|---|---|---|
| 2,622,851 | 12/1952 | Minor | 165/46 X |
| 2,625,804 | 1/1953 | Patch et al. | 165/46 X |
| 2,788,643 | 4/1957 | Martin | 62/343 X |
| 3,127,530 | 3/1964 | White | 165/46 X |
| 3,559,423 | 2/1971 | Scheidler | 62/293 |
| 3,742,723 | 7/1973 | Grise | 62/293 X |
| 4,019,020 | 4/1977 | Bilbee et al. | 165/46 X |
| 4,213,498 | 7/1980 | Vanden Bossche | 165/46 X |

*Primary Examiner*—William E. Tapolcai
*Attorney, Agent, or Firm*—Cohen, Pontani & Lieberman

[57] ABSTRACT

An ice cream-making apparatus is described wherein the freezer vessel is engageable in and disengageable from a cooling basket comprising two half-shell-like parts openable to receive the freezer vessel and to be clamped thereon. The cooling coil forming the basket is resiliently yieldable radially of the actual basket.

In an apparatus of this kind effective contact is always ensured between the cooling coil and the freezer vessel, so that efficiency is very high.

2 Claims, 6 Drawing Figures

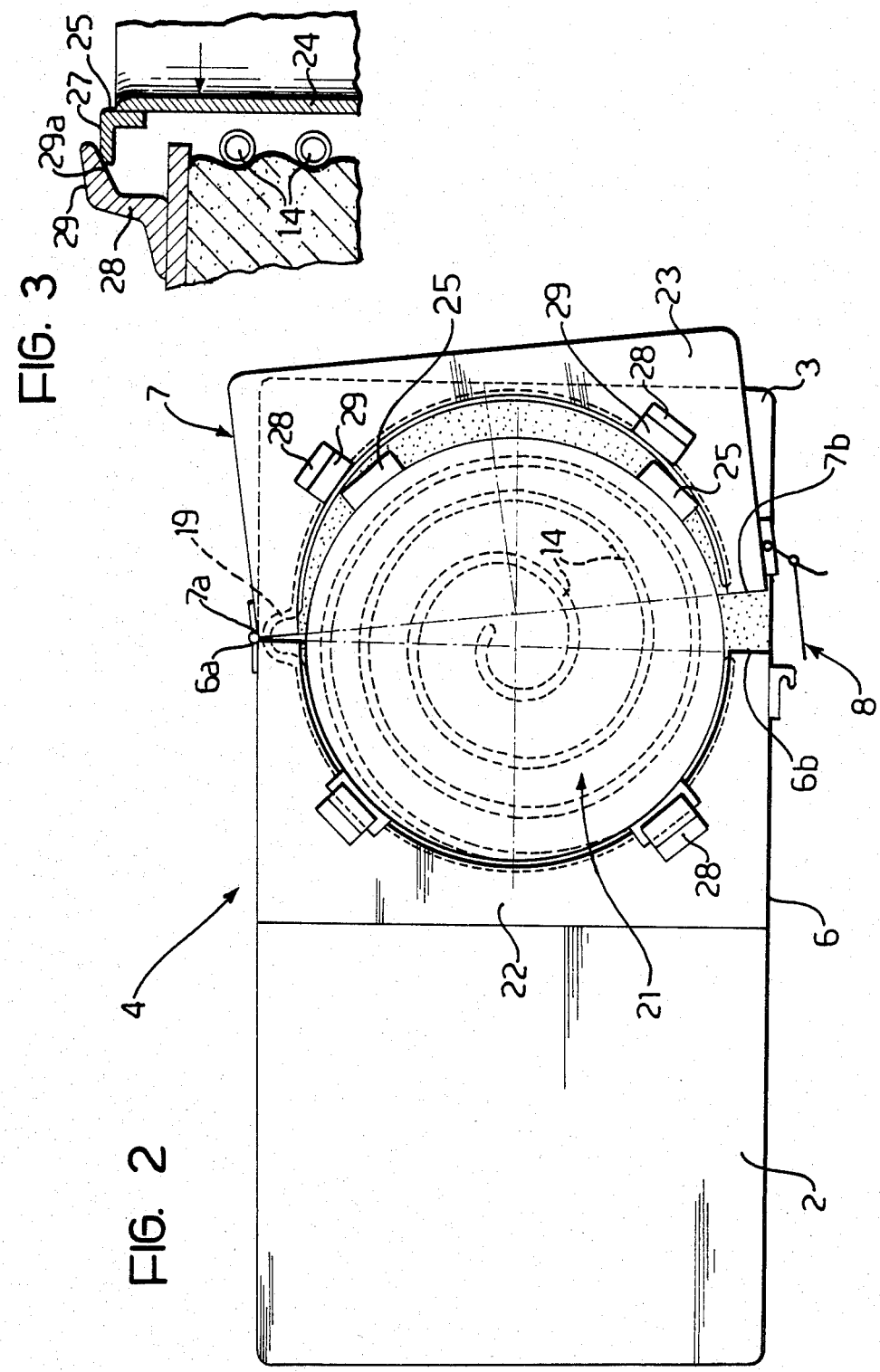

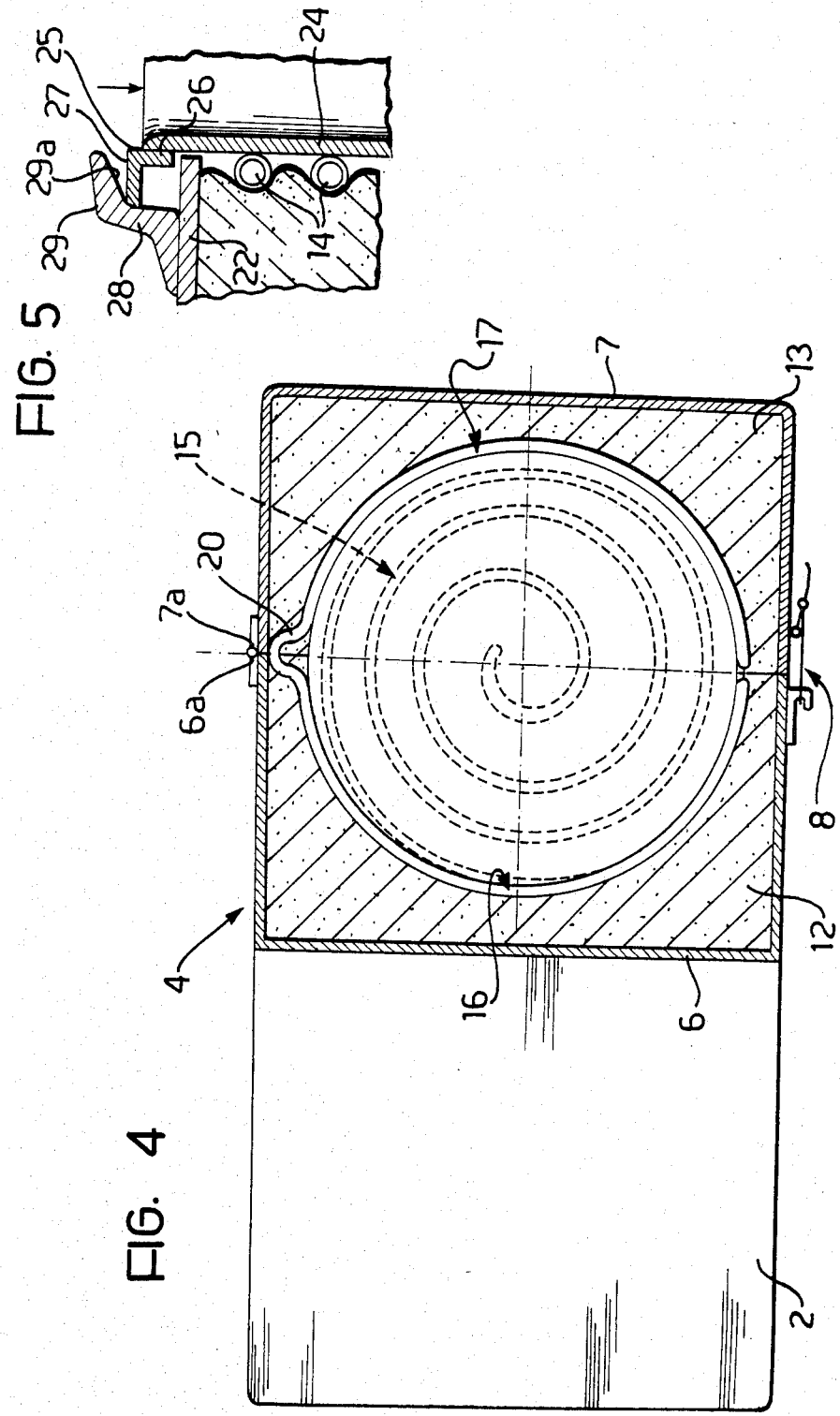

APPARATUS FOR MAKING ICE CREAM AND SIMILAR COLD PRODUCTS AND HAVING A REMOVABLE FREEZER VESSEL

DESCRIPTION

This invention relates to an apparatus for making ice cream and similar cold products, of the kind having a removable freezer vessel and comprising a support structure bonding a seat for supporting at least one cooling coil forming a cylindrical basket accessible from the top to receive the removable freezer vessel.

The term "freezer vessel" as used in the following description and claims is intended to denote a container, usually of stainless steel, in which the selected ingredients to make ice cream are mixed by a special rotating scraper blade device, the container being externally cooled by means of an appropriate cooling or refrigerating circuit. Of course a container of this kind, like the basket formed by the cooling coil in which the container is releaseably introducible, can be in shape cylindrical or conical or have the shape of any other body of revolution; however, for the sake of simplification and without limitation reference will be made in the following description and claims only to a cylindrical container and an associated cylindrical basket. With regard to the basket formed by the or each cooling coil, reference will be made to an inner cylindrical wall, the same being intended to denote the developed cylindrical surface of the cooling coil.

In an ice cream-making-apparatus, the fact that the freezer vessel is removable means that the ice cream produced can be recovered readily and rapidly just by turning the freezer vessel upside down, that washing of the freezer vessel may be performed readily, rapidly and accurately and, with advantage, away from electrical and/or other operating parts of the ice cream-making apparatus, and that dead times between two consecutive operating cycles are very brief even in the case of an apparatus having just one freezer vessel.

The conventional apparatuses can be broken down into two basic types, namely apparatuses in which the or each coil for the cooling liquid forms an upwardly flared conical basket adapted to receive a freezer vessel having the same conicity. Although the conicity may be carefully designed to ensure the necessary effective contact between the coil parts and the freezer vessel outer wall, contact does not in fact happen in the case of many of such parts for a variety of technical and technological reasons, such as minor errors in coil operation, deformability of the material—as a rule, copper—of which the coil is made, the result of distortions due to impacting or pushing, accidental pressures when the apparatus is in use, minor yieldings of the coil supports and so on. Of course, brine or ice forms wherever the contact between the coil and the vessel wall is unsatisfactory, with the result of a loss of cold (appreciable decrease in efficiency).

In another kind of ice cream-making apparatus the or each cooling coil extends around an auxiliary brine tank in which the freezer vessel is immersed. The disadvantages of apparatuses of this kind have to do mainly with the appreciable constructional complications, sealing problems, the need for accurate control and handling of the auxiliary brine tank to obviate any possible loss of brine, with the resulting possibility of irreparable damage to the working parts of the apparatus, and the laborious manipulation required to operate the apparatus.

The total of all these disadvantages has resulted in apparatuses of this kind being used industrially, and even there on a limited scale.

The problem which the invention intends to solve is to obviate the disadvantages of the prior art by providing an ice cream-making apparatus having constructional and operating features such that, as well as the freezer vessel being removable, satisfactory contact is always ensured between all the cooling coil parts at the freezer vessel outer wall without any impediment to the removability of such vessel.

This problem is solved in accordance with the invention by an apparatus to the kind hereinbefore considered wherein at least the side wall of the basket is embodied by two substantially half-shell-like parts movable relative to one another between an open position, in which the freezer vessel is readily engageable and disengageable between them, and a closed position, in which the basket is substantially restored, the inner diameter of the basket being less than the outer diameter of the freezer vessel, each of the parts of the at least one cooling coil which forms the basket being independently resiliently yieldable, and means being provided to maintain the substantially half-shell-like parts in the closed position.

Advantageously and preferably, the substantially half-shell-like parts are removable angularly around a generatrix of the cooling basket.

According to another feature of the invention, the substantially half-shell-like parts are introduced into and are in contact with respective blocks made of a resiliently yieldable material disposed in the support structure and bounding the seat thereof.

The main advantages of the apparatus according to this invention are as follows:

The freezer vessel can be introduced and removed readily and rapidly into and from the freezer basket when the same is open, thus providing all the advantages associated with a removable freezer vessel;

Effective contact is always ensured between each coolin coil part (the cooling coil forming the basket) and the freezer vessel outer wall, the contact being the result of the resilient reaction of each coil part independently of the reaction of the other coil parts when the substantially half-shell-like parts forming the cooling basket are clamped together.

Other features and advantages will become more clearly apparent from the following description of an embodiment of an apparatus for producing ice cream according to the invention, reference being made to the accompanying purely explanatory and non-limitative drawings wherein:

FIG. 2 is a plan view of the apparatus of FIG. 1 in one operating condition;

FIG. 3 is a view to an enlarged scale of a detail of the apparatus of FIG. 2;

FIG. 4 is a plan view in section of the apparatus of FIG. 2 in another operating position;

FIG. 5 is a view to an enlarged scale of the apparatus of FIG. 4, and

Figure 1:
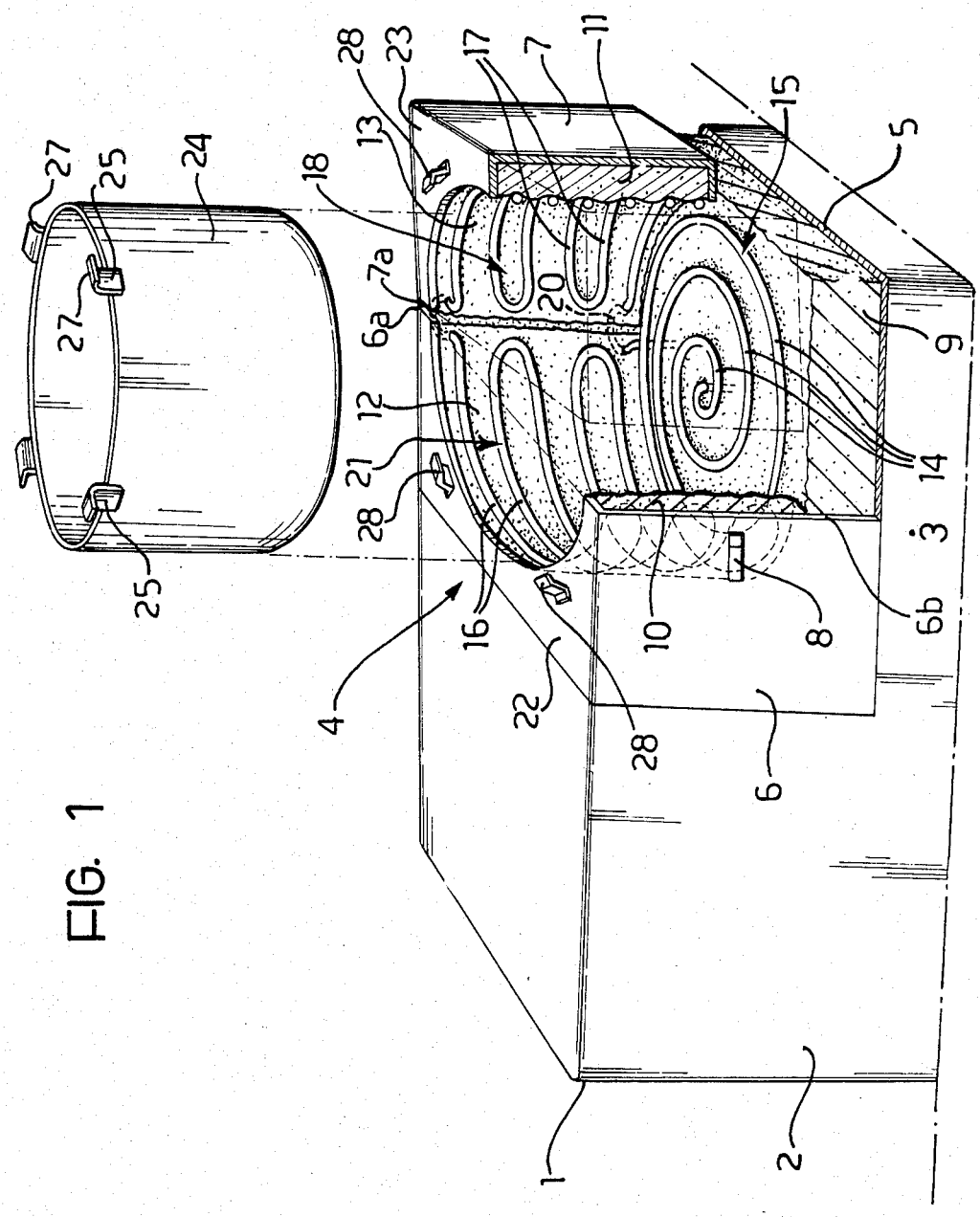
FIG. 1 is a diagrammatic partly exploded and part-sectioned view of an apparatus according to the invention.
Figure 6:
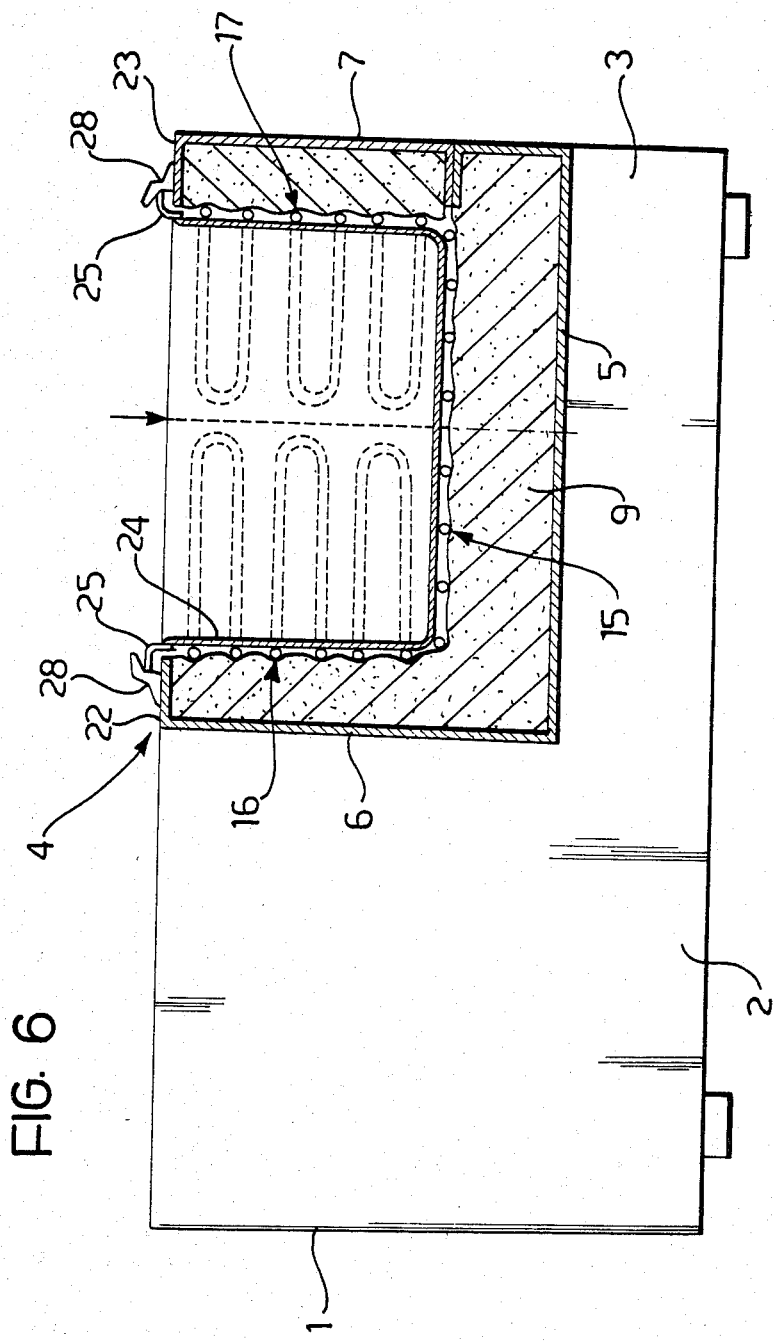
FIG. 6 is a diagrammatic vertical section through an ice cream-making apparatus according to this invention.

Referring to the drawings, a box-like member 1 carries an ice cream-making apparatus according to the invention. A portion 2 of the box 1 is adapted to receive, for instance, a conventional refrigerating unit (not shown) and possibly drive elements for rotating an ice cream-making blade, these elements being conventional and therefore not being shown. Laterally of the portion 2 the box 1 takes the form of a base 3 which is also box-like and which receives and supports operative parts of the apparatus according to the invention.

Disposed on base 3 is a bearing or support structure 4 made either of a plastic having appropriate mechanical characteristics or, and preferably, of metal. Preferably but not limitatively, the structure 4 has a baseplate 5 secured to the base 3 and has two identical parallelepipedic box members 6, 7 which are open towards one another and which lack the wall near the baseplate 5. More particularly, the member 6 is secured to or unitary with the baseplate 5. The member 7 has a vertical side 7a hinged to the opposite vertical side 6a of the member 6 by way of a vertical hinging axis. Those vertical sides 6b, 7b of the members 6, 7 respectively which are disposed opposite the hinged-together vertical sides are free.

The member 7 can be moved angularly around the hinging axis between an open position, in which its free side 7b is remote from the corresponding free side of the member 6, and a closed position, in which the free sides 6b, 7b are in contact with one another.

Clamping or locking means 8, for instance, of the toggle kind, are used to lock the members 6, 7 in their closed position. Of course, two or more devices 8 can be used if necessary.

A parallelepipedic block 9 made of a resiliently yieldable material, for instance and preferably, rubber, of a predetermined thickness is secured to the baseplate 5 by conventional means (not shown). Similar blocks 10, 11 of the same resiliently yieldable material are secured in the members 6, 7 respectively. The blocks 10, 11 are formed centrally with identical hemi-cylindrical recesses 12, 13 respectively which extend vertically from the block 9 to the top of the members 6, 7. When the members 6, 7 are in the closed position, the oppositely disposed recesses 12, 13 co-operate to bound a cylindrical seat whose axis is vertical and which is closed at the bottom by the block 9 and which is open at the top, the cylindrical seat being fully accessible from above through an appropriate circular aperture 21 disposed partly in top wall 22 of member 6 and partly in top wall 23 of member 7.

A cooling coil 14 extends as a spiral on the block 9, the coil 9 taking up a substantially circular surface and forming a circular base 15 of the same diameter as the diameter of the seat bounded by the recesses 12, 13.

The coil 14 (or another coil) extends, in the form of a predetermined number of turns in contact with the cylindrical walls of the recesses 12, 13, to form two substantially half-shell-like parts 16, 17 which co-operate with the circular base 15 to bound a cylindrical cooling basket 18.

The discrete coil parts 14 forming the half-shell-like parts 16, 17 are maintained in bearing engagement with the respective hemicylindrical walls of the recesses 12, 13 by conventional means which are not shown. Preferably, the complete cooling coil is partly boxed or embedded in the cylindrical walls of the recess 12, 13 and in the circular portion of the block 9. The discrete parts of the coil 14 are therefore resiliently yieldable independently of one another and different parts can be moved relatively to one another radially in connection with engagement with the cylindrical cooling basket 18.

Also, in the vertical hinging zone of the members 6, 7 the coil 14 forms substantially U-shaped top and bottom loops 19, 20 respectively to enable the member 7 and the associated half-shell-like part 17 to move when required.

A cylindrical freezer vessel 24 is used in the apparatus according to this invention; its outer diameter is greater than the inner diameter of the cylindrical cooling basket 18 as considered in the closed state—i.e., when the coil parts 16, 17 and the members 6, 7 are in the closed position. However, when the basket 18 is open, the basket inner wall co-operates with the freezer vessel outer wall to bound a consistent gap.

The freezer vessel 24 has substantially right-angled projections 25 disposed diametrically opposite one another around its opening; one arm 26 of each member 25 extends parallel to the axis of the vessel 24 while the other arm 27 extends outwards of the vessel 24.

Four right-angled members 28 are disposed diametrically opposite one another on the top walls 22, 23 of the members 6, 7; top part 29 of the members 28 extend radially towards the centre of the basket 18. FIGS. 3 and 5 show clearly how the parts 29 have an inclined underside 29a, the inclination extending upwardly and towards the basket 18. The surface or underside 29a is adapted to be engaged by the free side of the parts 27 of the members 26 on the vessel 24.

The apparatus according to the invention as hereinbefore described operates as follows:

In an initial state shown in FIGS. 1–3, the members 6, 7, 16, 17 are open, the opening being produced by member 7 being moved angularly around the vertical hinging axis.

The freezer vessel 24 is then operatively introduced into the basket 18; when fully introduced the vessel 24 bears on the basket base 15 but its lateral surface is substantially out of contact with the basket inner wall. This introduction is made with the members 25 of the vessel 24 offset from the members 28. When introduction of the vessel 24 has been completed, it is turned around its longitudinal axis until the parts 27 of the members 25 engage below the parts 29 of the members 28 (FIG. 3).

The member 7 is then moved around the vertical hinging axis so that the half-shell-like parts 16, 17 of the basket 18 take up the closed position, such position then being secured by means of the device 8. Since in the closed condition the basket inner wall is of smaller diameter than the freezer vessel outer wall as a result of the clamping, the cooling coil forming the basket extends effectively as a hoop around the freezer vessel. Also, because of the presence of the resiliently yieldable material on which the coil is mounted (preferably in partly boxed-in form), the resilient clamping reaction ensures effective contact between each part of the cooling coil and the freezer vessel outer wall.

During the angular movement of the member 7 and, therefore, of the member 17 and during the subsequent clamping step, the engagement of the parts 27 of the members 25 of the freezer vessel 24 with the inclined surfaces of the elements 28 produces a uniform downwards thrust on the vessel 24, so that contact between the freezer vessel base and the spirally extending cooling coil forming the basket base 15 is ensured. The downwards thrust occurs simultaneously with the clamping and hooping action hereinbefore described.

Upon completion of ice cream making, the or each device 8 is released, whereafter the members 7, 17 are moved angularly into the closed position so that the freezer vessel can be removed rapidly and possibly replaced by another freezer vessel which has been readied for a new cycle of production.

I claim:

1. An apparatus for making ice cream and similar cold products, of the kind having a removable freezer vessel (24) and comprising a support structure (4) bounding a seat (12, 13) for supporting at least one cooling coil (14) forming a cylindrical basket (18) accessible from the top to receive the removable freezer vessel (24), characterised in that at least the side wall of the basket (18) is embodied by two substantially half-shell-like parts (16, 17) movable relatively to one another between an open position, in which the freezer vessel (24) is readily engageable and disengageable between them, and a closed position, in which the basket is substantially restored, the inner diameter of the basket (18) being less than the outer diameter of the freezer vessel (24), each of the parts of the at least one cooling coil (14) which forms the basket (18) being independently resiliently yieldable, means (8) being provided to maintain the substantially half-shell-like parts (16, 17) in the closed position, said substantially half-shell-like parts (16, 17) being movable angularly around a generatrix of the cooling basket (18) and being introduced into and in contact with respective blocks (10, 11) made of a support structure (4) and bounding the seat (12, 13) for receiving the cooling basket (18), said cooling basket (18) having its base (15) in contact with a resiliently yieldable block (9) disposed in the support structure (4), and further comprising means (25–27; 28, 29, 29*a*) for urging the freezing vessel (24) on to the cooling basket base (15); whereby effective good contact is maintainable between said removable freezer vessel and said cooling coil in said apparatus.

2. An apparatus according to claim 1, characterised in that the support structure (4) is box-like and is embodied by two box members (6, 7) hinged to one another by way of their vertical sides (6*a,* 7*a*) with a vertical hinging axis, at least one (7) of the box members (6, 7) being angularly movable around the latter axis, between a first position, in which the half-shell-like parts (16, 17) of the cooling basket (18) are in their open position, and a second position, in which the last-mentioned parts are in their closed position.

* * * * *